(12) United States Patent
Leimeister et al.

(10) Patent No.: US 9,107,086 B2
(45) Date of Patent: Aug. 11, 2015

(54) INTEGRATION PANEL

(71) Applicant: ADC Telecommunications, Inc.

(72) Inventors: Eric Leimeister, Santa Cruz, CA (US);
David Vucich, Cupertino, CA (US);
Dean Zavadsky, Shakopee, MN (US);
Philip M. Wala, Savage, MN (US)

(73) Assignee: ADC Telecommunications, Inc., Berwyn, PA (US)

(*) Notice: Subject to any disclaimer, the term of this patent is extended or adjusted under 35 U.S.C. 154(b) by 200 days.

(21) Appl. No.: 13/777,275

(22) Filed: Feb. 26, 2013

(65) Prior Publication Data

US 2014/0022914 A1 Jan. 23, 2014

Related U.S. Application Data

(60) Provisional application No. 61/674,067, filed on Jul. 20, 2012.

(51) Int. Cl.
| | |
|---|---|
| *H04W 24/00* | (2009.01) |
| *H04W 88/08* | (2009.01) |
| *H04W 92/04* | (2009.01) |
| *H04W 24/04* | (2009.01) |
| *H04W 24/08* | (2009.01) |

(52) U.S. Cl.
CPC .............. *H04W 24/00* (2013.01); *H04W 24/04* (2013.01); *H04W 24/08* (2013.01); *H04W 88/085* (2013.01); *H04W 92/045* (2013.01)

(58) Field of Classification Search
CPC .... H04W 16/14; H04W 24/00; H04W 88/085
See application file for complete search history.

(56) References Cited

U.S. PATENT DOCUMENTS

| | | |
|---|---|---|
| 7,613,232 B2 | 11/2009 | Meir et al. |
| 7,626,467 B1 | 12/2009 | Butenhoff et al. |
| 7,958,531 B2 | 6/2011 | James et al. |

(Continued)

FOREIGN PATENT DOCUMENTS

EP 2159933 8/2008

OTHER PUBLICATIONS

"Digivance Long-Range Coverage Solution Dual Band 800 and 1900 MHz System Supplemental Manual", "ADCP 75-133", Aug. 2002, pp. 1-21.

(Continued)

*Primary Examiner* — Min Jung
(74) *Attorney, Agent, or Firm* — Fogg & Powers LLC

(57) ABSTRACT

An integration panel comprises a control module, a plurality of radio frequency (RF) modules, and a backplane configured to couple the plurality of RF modules to the control module. Each of the plurality of RF modules is configured to be coupled to a respective network device and to a host unit of a distributed antenna system. Each RF module is further configured to condition the RF signals received from the respective network device and to provide the conditioned RF signals to the host unit. Each of the RF modules is configured to sample the conditioned RF signals and to provide the sampled RF signals to the control module via the backplane. The control module is configured to perform signal analysis of the sampled RF signals and to provide the results of the signal analysis to a user device located remotely from the integration panel.

20 Claims, 13 Drawing Sheets

(56) References Cited

U.S. PATENT DOCUMENTS

| | | |
|---|---|---|
| 8,010,116 B2 | 8/2011 | Scheinert |
| 8,145,166 B2 | 3/2012 | Barber et al. |
| 2007/0274279 A1 | 11/2007 | Wood et al. |
| 2008/0058018 A1 | 3/2008 | Scheinert |
| 2010/0278530 A1 | 11/2010 | Kummetz et al. |
| 2010/0296816 A1 | 11/2010 | Larsen |
| 2011/0143649 A1 | 6/2011 | Sabat, Jr. et al. |
| 2011/0201269 A1 | 8/2011 | Hobbs et al. |
| 2011/0216751 A1 | 9/2011 | Bianchi et al. |
| 2011/0244785 A1 | 10/2011 | Scheinert |
| 2011/0258693 A1 | 10/2011 | Sabat, Jr. et al. |
| 2012/0039254 A1 | 2/2012 | Stapleton et al. |
| 2012/0039320 A1 | 2/2012 | Lemson et al. |
| 2012/0069880 A1 | 3/2012 | Lemson et al. |
| 2012/0093084 A1 | 4/2012 | Wala et al. |
| 2012/0149411 A1 | 6/2012 | Miyoshi et al. |
| 2013/0017863 A1* | 1/2013 | Kummetz et al. .......... 455/562.1 |
| 2013/0051278 A1* | 2/2013 | Watkins et al. ............... 370/254 |
| 2013/0201916 A1* | 8/2013 | Kummetz et al. ............. 370/328 |

OTHER PUBLICATIONS

, "i-POI: Intelligent Point of Interface", Apr. 5, 2012, pp. 1-8, Publisher: www.commscope.com.

Hoglund, "Distributed Antenna Systems for Healthcare", Nov. 20, 2009, pp. 32-38, Publisher: IT Horizons.

Korean Intellectual Property Office, "International Search Report and Written Opinion", "from PCT Counterpart of U.S. Appl. No. 13/777,275", Nov. 13, 2013, pp. 1-10, Published in: KR.

* cited by examiner

INTEGRATION PANEL

CROSS-REFERENCE TO RELATED APPLICATION

This application claims the benefit of U.S. Provisional Patent Application Ser. No. 61/674,067, filed on Jul. 20, 2012, which is hereby incorporated herein by reference.

BACKGROUND

This application relates to providing Radio Frequency signals to a distributed antenna system.

SUMMARY

In one embodiment an integration panel is provided. The integration panel comprises a control module, a plurality of radio frequency (RF) modules, and a backplane configured to couple the plurality of RF modules to the control module. Each of the plurality of RF modules is configured to be coupled to a respective network device and to a host unit of a distributed antenna system. Each RF module is further configured to condition the RF signals received from the respective network device and to provide the conditioned RF signals to the host unit. Each of the RF modules is configured to sample the conditioned RF signals and to provide the sampled RF signals to the control module via the backplane. The control module is configured to perform signal analysis of the sampled RF signals received from each of the plurality of RF modules and to provide the results of the signal analysis to a user device located remotely from the integration panel.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. The following detailed description is, therefore, not to be taken in a limiting sense.

Figure 1:
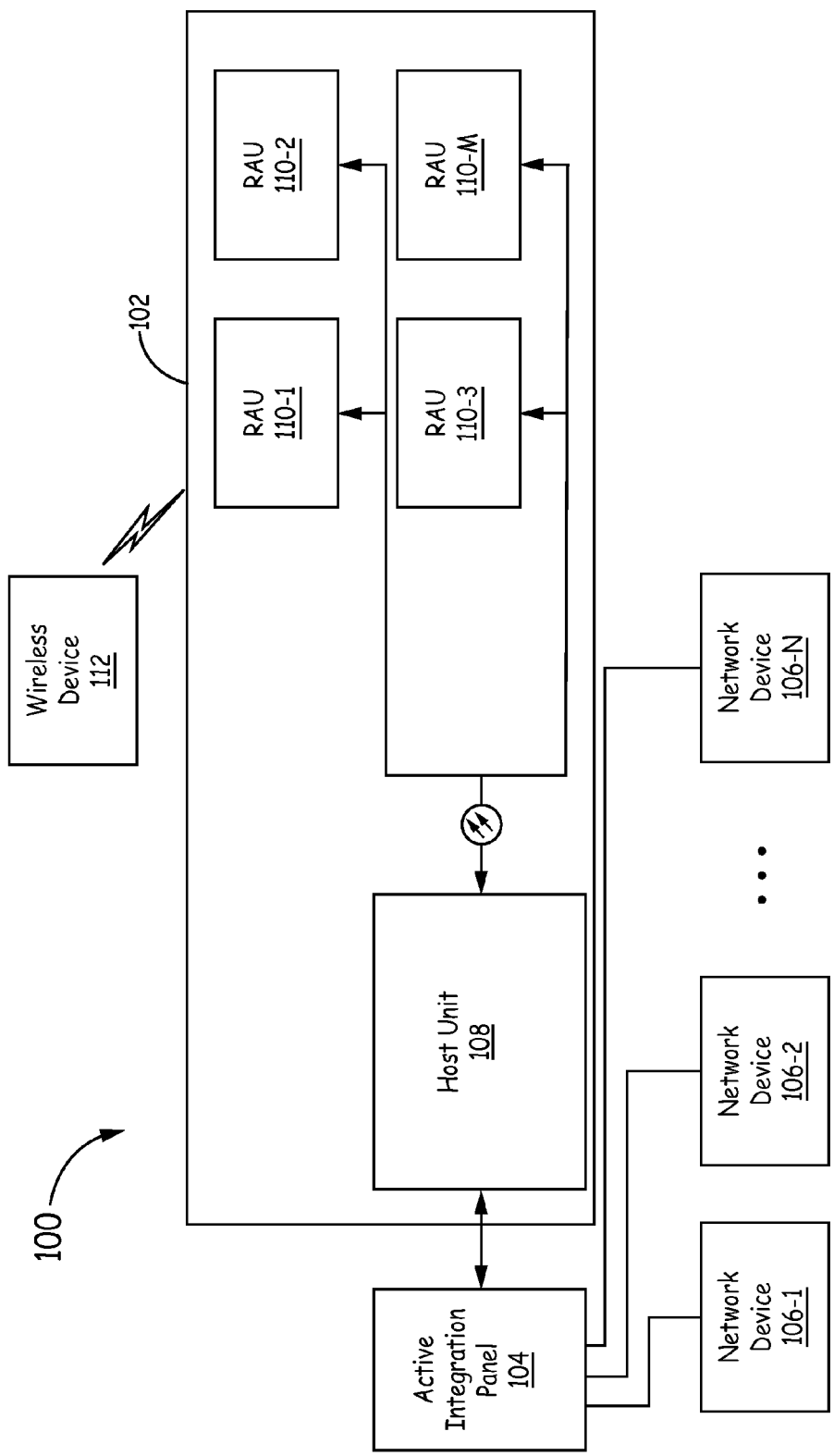
FIG. 1 is a block diagram of one embodiment of a communication network

FIG. 1 is a block diagram of one embodiment of a communication network 100. The communication network 100 includes a distributed antenna system (DAS) 102, an active integration panel (AIP) 104, and a plurality of network devices 106-1 ... 106-N. Each of the plurality of network devices 106-1 ... 106-N is implemented based on the respective network technology. For example, each network device 106 can be implemented as, but not limited to, a base transceiver station (BTS) for use with Global System for Mobile Communications (GSM) technology, a node B (or enhanced node B) for use with Universal Mobile Telecommunications System (UMTS) technology, or an evolved node B (EnodeB) for use with Long Term Evolution (LTE) technology.

Each network device 106 can be configured to support a wireless technology and radio frequency band that is different from one or more of the other network devices 106. Exemplary frequency bands include, but are not limited to, 700 MHz, 850 MHz, 1900 MHz, and 2100 MHz. It is to be understood that the wireless technologies and frequency bands above are provided by way of example and that other wireless technologies and/or frequency bands can be also be implemented. For example, other wireless technologies can include, but are not limited to, Worldwide Interoperability for Microwave Access (WiMAX), Wireless Broadband (WiBro), Code Division Multiple Access (CDMA), Wideband Code Division Multiple Access (WCDMA), Evolution-Data Optimized (EV-DO), and Evolved High Speed Packet Access (HSPA+). Additionally, an exemplary range of frequency bands supported by network 100 is 690 MHz to 2700 MHz.

The DAS 102 is configured to distribute communication signals over a medium to a plurality of remote antenna units (RAUs) 110-1 ... 110-M. In this example, the medium is implemented using optical fiber. However, it is to be understood that other communication media can be used in other embodiments. The RAUs 110-1 ... 110-M communicate signals received from the host unit 108 to one or more wireless devices 112. In particular, the signals are communicated using the wireless technology of the respective source network device 106. Thus, the signals from the respective network devices 106 are distributed to the remote antenna units 110 for communication with corresponding wireless devices 112. The RAUs 110-1 ... 110-M also communicate signals received from the wireless devices 112 back to the host unit 108 over the medium. The host unit 108 then communicates the signals received from the RAUs 110-1 ... 110-M to the respective network device 106 via the AIP 104.

The AIP 104 provides an interface between the network devices 106 and the host unit 108. In particular, the AIP 104 provides an interface between a duplex port (e.g. bi-directional ports) of the network devices 106 and simplex ports (e.g. unidirectional uplink and downlink ports) of the host unit 108. Additionally, the AIP 104 enables the combining of signals from multiple base stations/protocols into the DAS host unit 108. The AIP 104 is also configured to monitor and control signal power actively or automatically on the uplink and downlink. As used herein the uplink refers to the direction of signals traveling from the wireless devices 112 to one of the network devices 106. The downlink refers to the direction of signals traveling from one of the network devices 106 to a wireless device 112.

Hence, the AIP 104 monitors and controls the power of the signals input to the DAS host unit 108 from each of the network devices 106. For example, the wireless technology/protocol, service provider, and frequency band influence the power level of the signals input to the AIP 104. The AIP 104 conditions the signals to meet the requirements of the host unit 108. In this example, the AIP 104 supports a range of composite signal power from 0.25 Watts to 100 Watts.

Additionally, the AIP 104 distributes the total available signal power among the signals from the different network devices 106. For example, network device 106-1 can be operated by a first service provider and network device 106-2 is operated by a second service provider. The DAS 102 can be owned and operated by one of the service providers or by another entity. The maximum signal power allocated to a given network device 106, in such scenarios, can be agreed upon and enforced by the AIP 104.

Figure 2:
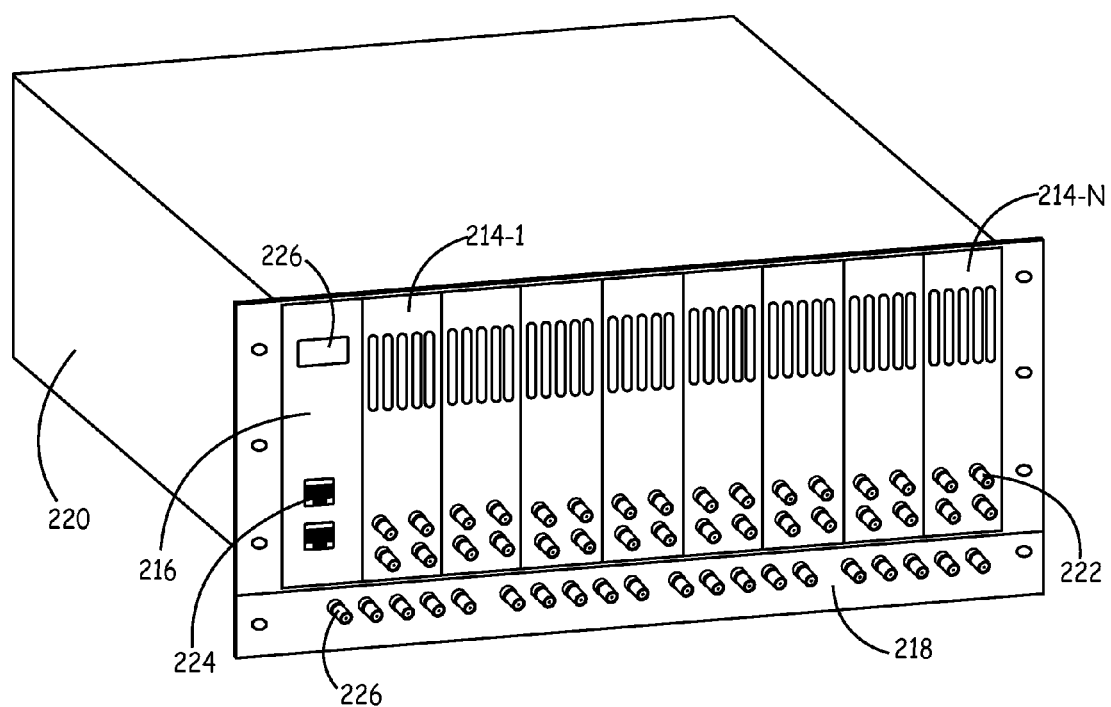
FIG. 2 is a perspective view of one embodiment of an active integration panel.

FIG. 2 is a perspective view of one embodiment of an active integration panel (AIP) 204 which can be implemented in a network such as network 100. As used herein, a module refers to a device configured to perform a specific function which can be inserted and removed from the AIP 204. The AIP 204 includes a plurality of radio frequency (RF) modules 214-1 . . . 214-N. In this embodiment, there are 8 RF modules 214. However, in other embodiments, a different number of RF modules 214 are included. The AIP 204 also includes a control module 216. The control module 216 and the RF modules 214 are inserted into a shelf 220. The shelf 220 is configured to fit into a conventional 19 inch rack in this embodiment. However, other sizes of shelf 220 can be used in other embodiments. For example, in another embodiment, the shelf 220 is configured to fit into a conventional 23 inch rack.

Each of the RF modules 214 is band-specific. That is, each RF module 214 is configured to operate in a specific frequency band and support specific wireless modulation technologies, such as the wireless technologies mentioned above. As discussed previously, the respective frequency band for each RF module 214 can be different from the respective frequency band of other RF modules 214. Each RF module 214 is configured to condition the downlink signal power from the corresponding network device (e.g. BTS) to a level appropriate for application to the corresponding DAS RF input and to condition the uplink signal and noise power from the corresponding DAS to the corresponding network device. Each RF module 214 contains downlink RF power monitoring circuitry for auto configuration, automatic level control (ALC) and user settable upper and lower thresholds and alarms. In addition, each RF module 214 is configured to enable and disable downlink RF signals, such as by terminating downlink power in a load with an RF switch.

Additionally, each RF module 214 is a hot-swappable plug-in module. That is, each RF module 214 can be inserted or removed from the AIP 204 without powering down the AIP 204. Each RF module 214 includes a plurality of ports 222 on a front side 228 of the RF module 214. In some embodiments, one or more of the ports 222 is a duplex port for communication with a duplex port of a base station. In other embodiments, one or more ports are included in a rear side of the RF module 214 as described in more detail below. The number and type of ports in each RF module 214 can vary based on the specific implementation of the respective RF module 214.

Figure 9:
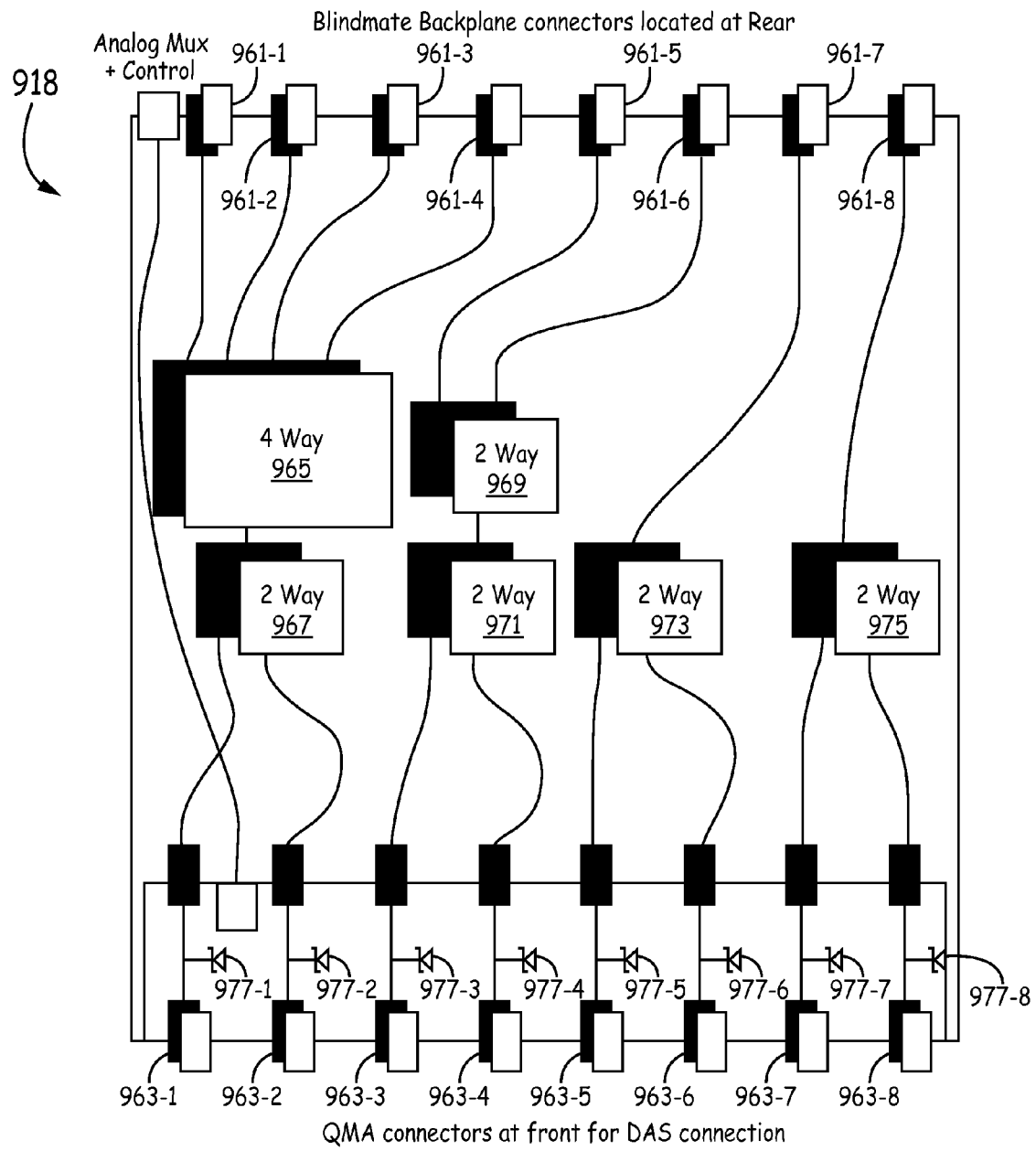
FIG. 9 is a high level block diagram of one embodiment of a combiner/splitter tray.

The AIP 204 also includes a splitter/combiner tray 218 which includes a plurality of ports 226. The splitter/combiner tray 218 is configured to combine signals from two or more RF modules 214 for input to a DAS host unit. The splitter/combiner tray 218 is also configured to separate signals received from the DAS host unit for delivery of the separated signals to the respective RF module 214. In particular, in this example, the splitter/combiner tray 218 houses passive splitters and combiners that are used to combine up to 4 band specific RF modules (e.g. PCS Modules are combined with PCS modules, Cell modules to Cell modules, etc.) to a common point and then split those signals from 1 to 4 band specific DAS inputs. The splitter/combiner tray 218 is configured to be plugged-in and easily configurable at the factory or the field based on needs for each individual installation. The splitter/combiner tray 218 also allows for two, three or four way combining. Similarly, for signals feeding the DAS, the splitter/combiner tray 218 is configurable to feed 1, 2, 3 or 4 DAS inputs. An exemplary splitter/combiner tray is depicted in FIG. 9.

The control module 216 of AIP 204 communicates with each of the RF modules 214 for monitoring and control. Additionally, in some embodiments, whereas the RF modules 214 are hot-swappable, the controller module 216 includes an on/off switch that enables/disables power to the controller module 216 as well as to the full AIP 204. Hence, to field swap a controller module 216, the AIP 204 is powered down.

The control module 216 also includes one or more ports 224 through which users can monitor and control the AIP 204 using, for example, a web browser and/or Simple Network Management Protocol (SNMP). In particular, the control module 216 is capable of sending SNMP traps for alarms. In this example, ports 224 are configured as Ethernet RJ45 ports. The ports 224 enable remote configuration and troubleshooting via an external network. For example, in some embodiments, the control module 216 can be accessed via a standard web browser over the external network, such as the internet, as discussed below with respect to FIG. 3. Additionally, in some embodiments, the control module 216 includes a craft port that enables local access to configuration and troubleshooting of the AIP 204, as discussed in more detail below with respect to FIG. 4. The control module 216 also optionally includes a local user interface 226. The user interface 226 can include a screen and push button control. The screen can be any suitable screen for display of data, such as, but not limited to a liquid crystal display (LCD). The user interface 226 enables a user to locally configure basic parameters and monitor the AIP without a computer or network connection. In some embodiments, the parameters which can be configured via the user interface 226 are a subset of the total parameters which can be configured with a computer or network connection to the AIP.

Figure 3:
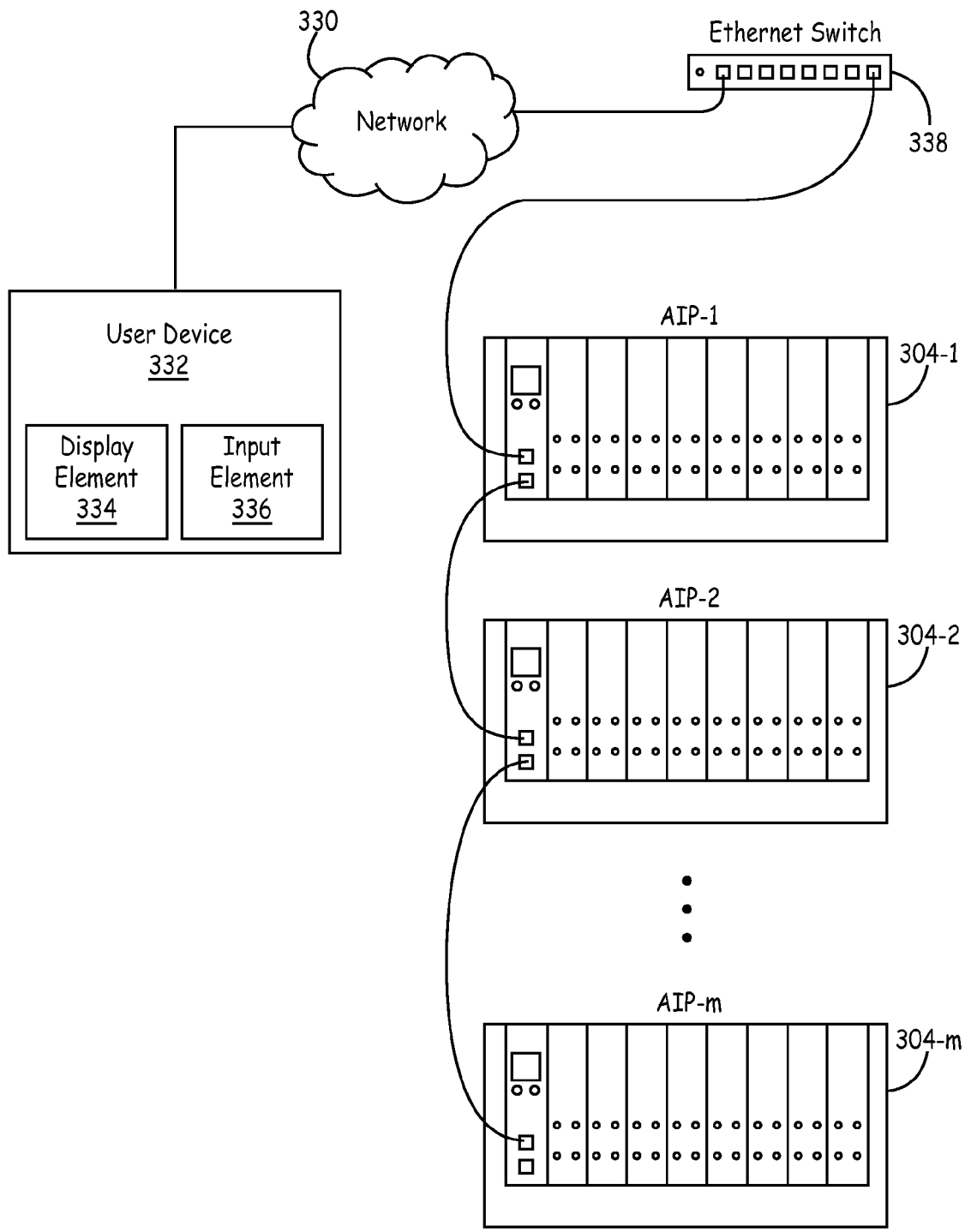
FIG. 3 depicts a plurality of active integration panels coupled to an external network.

FIG. 3 depicts a plurality of active integration panels coupled to an external network 330. An external network is a network not used for communicating signals between the network devices (e.g. BTS or nodeB) and wireless devices in communication with the distributed antenna system. In this embodiment, the AIP 304-1 is designated as a main AIP. The main AIP is coupled to the external network 330 via an Ethernet switch 338 in this example. The AIP 304-1 . . . 304-*m* are linked together on a private local network, such as a 10/100 Ethernet or 10/100/1000 Ethernet local area network. The main AIP 304-1 provides a single point of contact to an external network. The AIP 304-1 . . . 304-*m* are physically linked by daisy chaining the private Ethernet from one AIP to the next. Hence, multiple integration panels can be used for large installations while maintaining one IP address and Ethernet connection to the user for all integration panels.

A user device 332 is coupled to the main AIP 304-1 via the network 330. The user device 332 is located remotely from the AIP 304. That is, it is not physically located in the vicinity of the AIP 304. The user device 332 includes a display element 334 which can display a graphical user interface (GUI) for viewing data received from the main AIP 304-1, such as parameters/settings of each AIP as well as any alarms. The main AIP provides the GUI for display on the display element 334 via a web interface or SNMP interface. The user device 332 displays configuration parameters, alarms, etc. on the display element 334. The display element 334 can be implemented using any suitable display element capable of rendering a visual display, such as, but not limited to, a cathode ray tube (CRT) display, an active matrix liquid crystal display (LCD), a passive matrix LCD, or plasma display unit.

The user device 332 also includes an input element 336 which receives input from a user. The input element 336 can be implemented as, but is not limited to, keyboards, touch screens, microphones, cursor control devices, line select buttons, etc. The user device 332 also transmits commands entered via the input element 336 to the corresponding AIP 304 in order to configure and control the corresponding AIP 304. The user device 332 can be implemented as any type of fixed or mobile computing device capable of connecting to the network 330 and of executing a software application for control and monitoring of the AIP 304. For example, the user device can be implemented as a desktop or laptop computer, a tablet computer, smartphone, etc.

Hence, via the user device 332, a user can configure and control the AIP 304. In particular, some settings which can be controlled include, but are not limited to, downlink and uplink gain; downlink and uplink path overpower and underpower thresholds; uplink path overpower threshold; IP address (configured statically or by enabling DHCP assignment); date and time; user login names and passwords; labels for the respective AIP and RF modules; SNMP read-only and read-write community strings; SNMP permitted manager IP addresses; SNMP trap destinations, including on an RF module basis; and enabling/disabling of individual alarms, including on an RF module basis. In addition, the user can control output of diagnostic tones and reboot of the control module. In addition, the network connection via the Ethernet switch 338 enables software upgrades to be downloaded and applied to the AIP 304.

Figure 4:
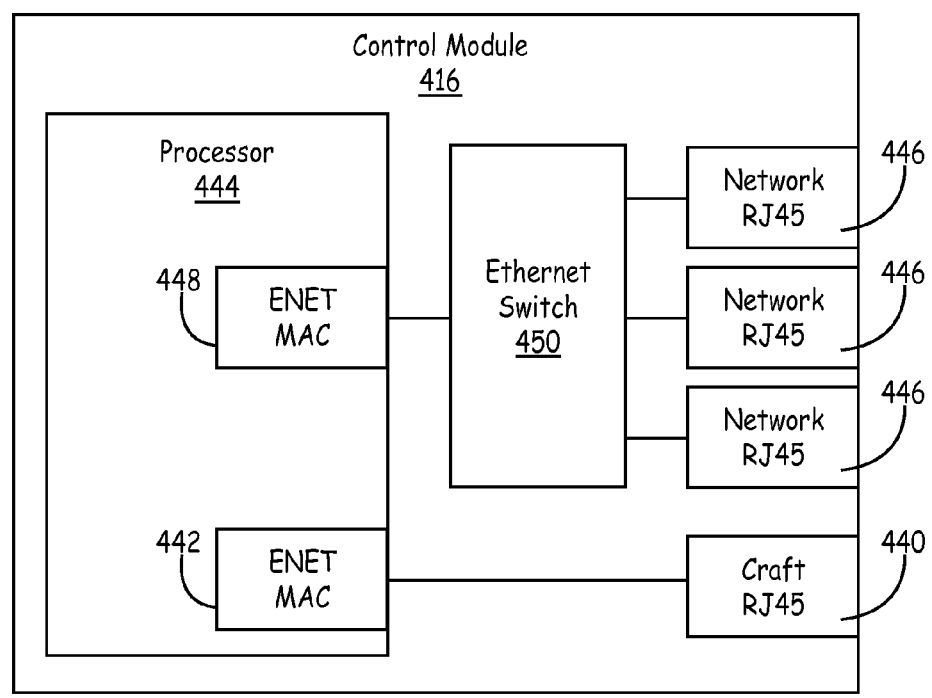
FIG. 4 is a high level block diagram of one embodiment of a control module 416.

FIG. 4 is a high level block diagram of one embodiment of a control module 416. The control module 416 can be implemented in the main AIP 304-1. In particular, the control module 416 includes a craft port 440, such as an RJ45 10/100 Ethernet or 10/100/1000 Ethernet craft port. The craft port 440 is coupled via Ethernet physical layer networking hardware to an Ethernet media access controller 442 implemented with a processor 444. The craft port 440 can be used to enable a user to connect another device, such as a portable computer, to the control module for configuring or monitoring the AIP.

The control module 416 also includes a plurality of networking ports 446. Each of the network ports 446 is also implemented with an RJ45 10/100 Ethernet or 10/100/1000 Ethernet port in this example. Each of the networking ports 446 is coupled to an Ethernet media access controller 448 via an Ethernet switch 450 embedded in the control module 416. If implemented in a control module of a main AIP, one of the networking ports 446 is coupled to an external network, such as the internet, via an external Ethernet switch as discussed above. One or more of the other networking ports 446 is coupled to a networking port in another control module in a separate integration panel. If not configured as the control module of a main AIP, each of the network ports 446 is coupled to another AIP. Hence, the processor 444 is configured to route Ethernet packets to the corresponding networking port 446. In this manner the control module 416 supports daisy chaining multiple integration panels and provides a single point of contact through a main AIP to an external network. In some embodiments, up to 32 integration panels can be daisy chained and supported by the control module of the main AIP. Daisy chaining the integration panels in this manner enables each of the integration panels to be remotely monitored and configured while only requiring a single IP address for use on the external network.

Figure 5:
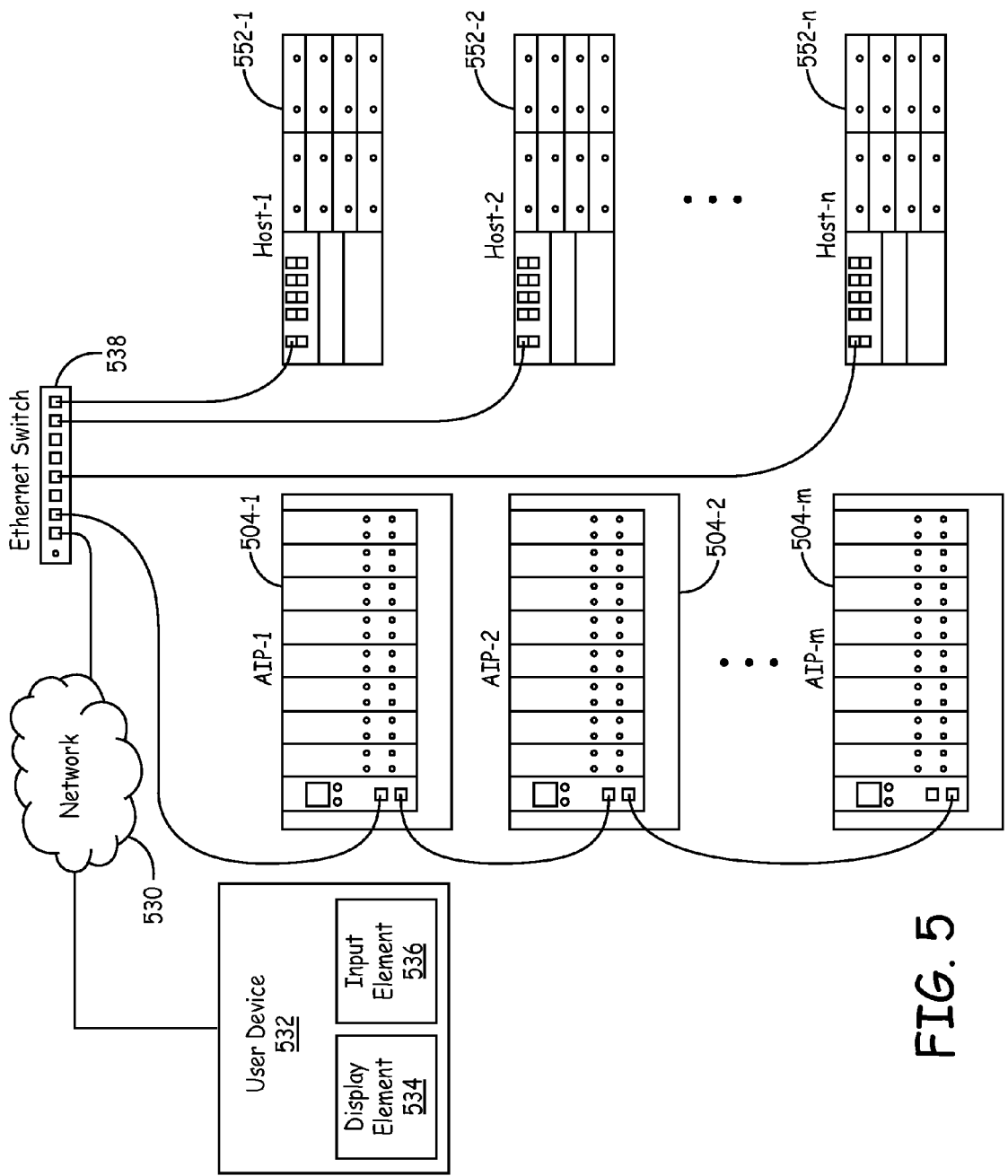
FIG. 5 depicts a network in which a main active integration panel is configured to manage other integration panels and corresponding DAS systems.

Furthermore, as shown in FIG. 5, a main AIP is configured to implement a protocol, such as SNMP, to manage other AIPs daisy-chained to the main AIP as well as the corresponding DAS systems, in some embodiments. That is, a single interface is accessible via the network 530 to manage both the AIP 504-1 ... 504-m and the DAS host units 552-1 ... 552-n. The main AIP 504-1 provides a web and SNMP interface for display on the display element 534. In addition, the main AIP 504-1 recognizes the DAS host units 552 and manages the DAS host units 552 as network elements. For example, in one embodiment, the AIP 504-1 provides a master GUI to the user device 532 for display on the display element 534. The user is able to navigate through a menu structure of the GUI via the input element 536.

In one embodiment, the master GUI includes a functional block or menu item associated with each DAS host unit 552 and each AIP 504. For example, the master GUI displays a topology of all the elements (e.g. DAS host units 552 and AIP 504). When a user selects one of the menu items or functional blocks, representing a respective element, the user is presented with a GUI provided by the respective DAS host unit 552 or AIP 504. The GUI from the respective DAS host unit or AIP 504 can be framed or embedded in the master GUI provided by the main AIP 504-1. The master GUI enables a user to "back up" to the overall topology and select another DAS host unit 552 or AIP 504. In this way, a user is able to navigate through the respective DAS host units 552 and AIP 504 through a single interface. In other words, the master GUI provides remote access to both the DAS host units 552 and the AIP 504 via the master GUI.

In an alternative embodiment, one of the DAS host units 552 can be configured to provide the master GUI via the network 530 which enables monitoring and control of both the respective DAS host units 552 and the plurality of AIP 504. Hence, in such embodiments, the DAS host unit manages the plurality of AIP 504 as a network element accessed via the Ethernet switch 538.

Figure 6:
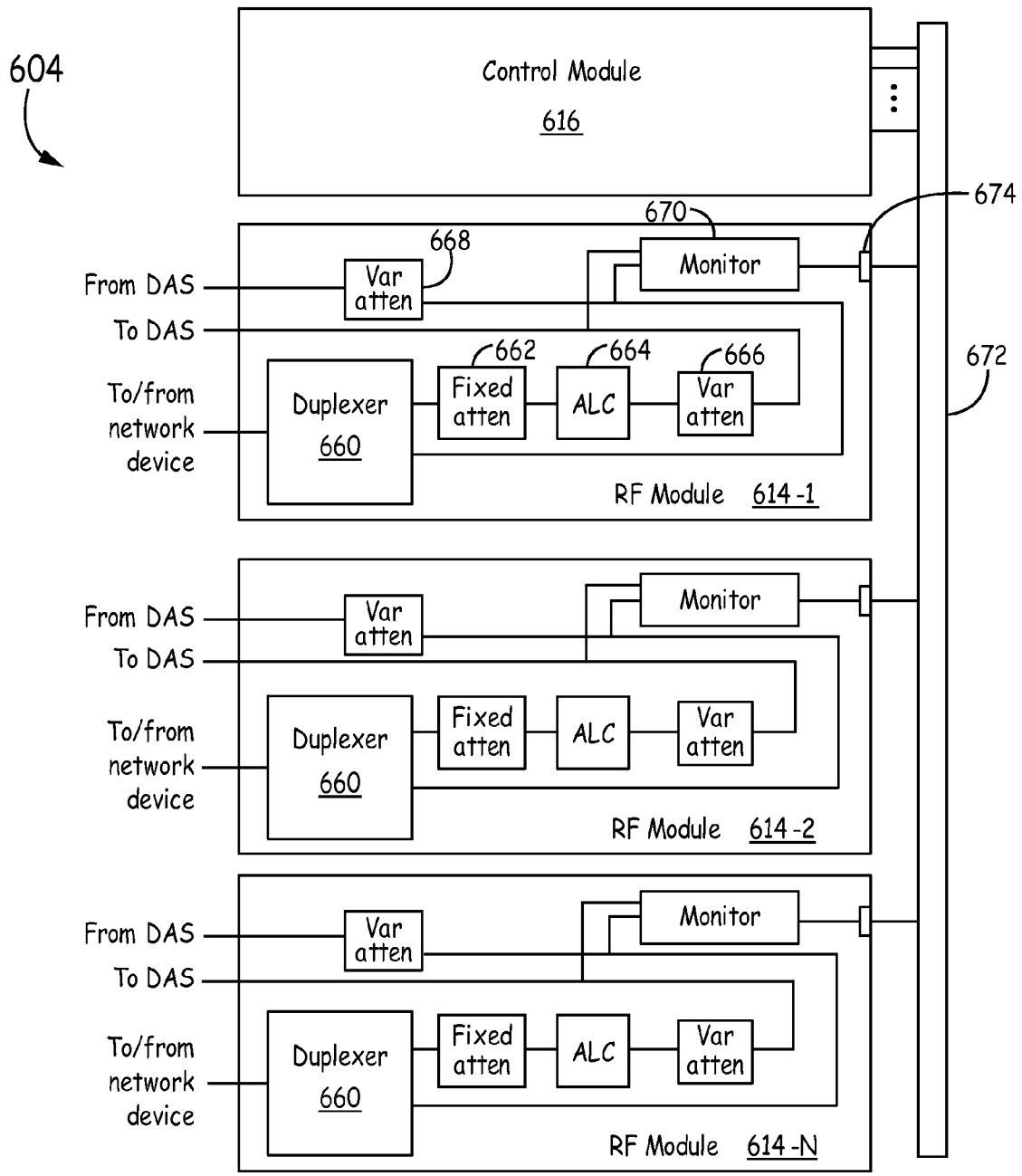
FIG. 6 is a high level block diagram of one embodiment an active integration panel.

In addition, as discussed above, each of the RF modules in each AIP is configured to actively monitor power levels on the uplink and downlink. FIG. 6 is a block diagram of an exemplary AIP 604 in which the RF modules 614 monitor and control power levels. It is to be understood that the functional blocks of RF modules 614 are provided for purposes of explanation and that additional components can be included in each RF module. Furthermore, it is to be understood that although the functional blocks for monitoring and controlling power levels in each RF module 614 are similar, other components of each RF module may be different. For example, each RF module 614 is configured for a specific frequency band and wireless protocol. Therefore, components specific to the frequency band and/or wireless protocol will differ from one RF module 614 to another.

In the example shown in FIG. 6, each RF module 614 includes a duplexer 660 which is coupled to a duplexer port in a network device, such as a base transceiver station. The duplexer 660 separates signals received from the respective network device from signals being output to the network device. That is, the duplexer 660 separates downlink signals from uplink signals. The downlink signals are passed through a fixed attenuator 662. As used herein, a fixed attenuator is an attenuator having a single attenuation level. However, the specific attenuation level can vary from RF module to RF module. In addition, the fixed attenuator 662 can be comprised of a plurality of attenuators as described in more detail below.

After passing through the fixed attenuator 662, the downlink signal passes through the automatic level control (ALC) 664. The ALC 664 monitors the power level of the downlink signal and adjusts the attenuation level accordingly to maintain the power level of the downlink signal at a predetermined power level. In particular, the ALC 664 monitors samples of the downlink RF power averages to smooth variations due to traffic conditions. The averaging is user configurable. For example, a user can configure a window size used for averaging the RF power. When a downlink overpower condition occurs, a microcontroller in the RF module 614 automatically adjusts the ALC attenuator value to lower the RF output power to the user configured operating level. In some embodiments, an overpower alarm is reported to a microprocessor in the control module which signals the alarm via an SNMP trap.

The RF module 614 also includes a variable attenuator 666 which has a varying level of attenuation. However, unlike the ALC 664, the variable attenuator 666 is adjusted by a user rather than adjusting the attenuation level automatically. For example, the variable attenuator 666 can be adjusted via local controls on the AIP 614 or remotely via an external network connection, as discussed above. The variable attenuator 666 and fixed attenuator 662 are used to attenuate the downlink signal to an approximate desired power level. The ALC 664 then fine tunes the attenuation of the downlink signal to a more precise power level and reacts automatically to variations in the received downlink power level to maintain the power level of the downlink signal at the desired level.

The uplink signal passes through a variable attenuator 668 which is adjusted by a user. The attenuated uplink signal is then duplexed onto the link between the network device and the RF module 614 via the duplexer 660. A monitor 670 monitors and samples both the uplink and downlink signals in this example. Each RF module 614 includes an observation port 674 which enables the monitor 670 to output the sampled signals to a backplane 672. As used herein, a backplane is a printed circuit board with slots or electrical connectors configured to receive a respective plug-in card or module. The sampled signals are provided to the control module 616 via the backplane 672.

The control module 616 is configured to perform signal analysis of the uplink and downlink signals from each of the RF modules 614. For example, the control module 616 can be configured to extract a cell ID from each downlink signal to identify which base station is the source of the respective downlink signal, to identify the wireless protocol of the signals (also referred to as Radio Access Technology identification), to identify the service provider (also referred to as Public Land Mobile Network identification), and/or to determine signal quality of signals input from the network device and input from the DAS (e.g. error vector magnitude (EVM) estimation). It is to be understood that the above analyses are provided by way of example and that other analyses can be performed in addition to or in lieu of those listed above.

By performing the above analyses, the control module 616 is able to more easily determine the source of a detected problem. For example, the control module 616 can determine if the source of a fault is in the connection between the network device and the AIP, in the AIP, or in a connection between the AIP and the DAS. Additionally, the control module 616 is able to determine if PLMN-based policies are being implemented properly. For example, the control module 616 can determine if the maximum power level assigned to a given service provider is being enforced. Additionally, the control module 616 can output SNMP traps to signal faults to a remote user.

Figure 7:
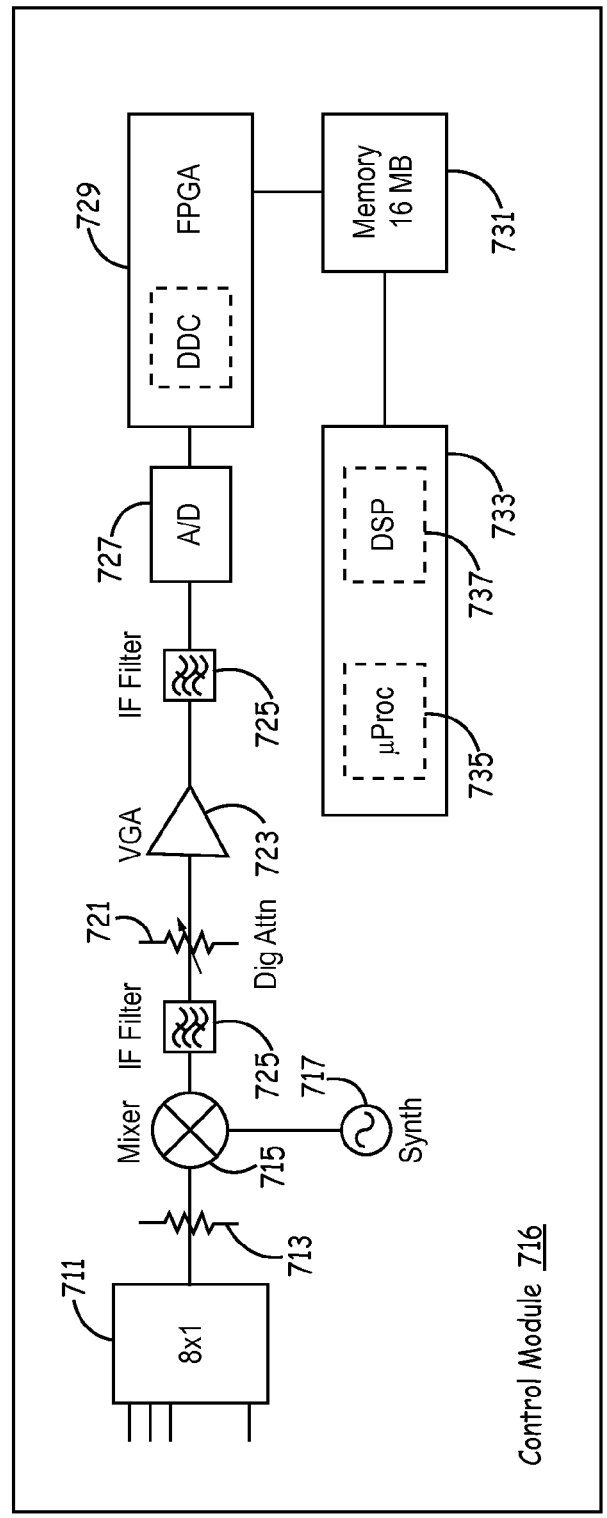
FIG. 7 is a circuit diagram of one embodiment of a control module.

An exemplary circuit diagram of one embodiment of a control module 716 is depicted in FIG. 7. Control module 716 includes a multiplexer 711. The multiplexer 711 combines the sampled signals from each of the RF modules for further processing downstream. In this example, there are 8 total RF modules. Hence, the multiplexer 711 is an 8×1 multiplexer. However, in other embodiments, the size of the multiplexer is configured to match the maximum number of RF modules in the AIP. The multiplexed signal then passes through an attenuator 713 and a mixer 715. The mixer 715 downconverts that multiplexed signal to an intermediate frequency (IF) based on a signal from an oscillator 717. The IF signal is then passed through an IF filter 719 to reduce noise and signals outside the desired frequency bandwidth. The filtered IF signal is then passed through a variable attenuator 721 and a variable gain amplifier 723 which condition the filtered IF signal to have a desired power level. The signal is then passed through a second IF filter 725 to remove noise introduced by the variable attenuator 721 and variable gain amplifier 723. The signal is then converted to a digital signal in analog to digital converter (ADC) 727.

The digital signal is input to a processing device 729, such as a field programmable gate array (FPGA), which is configured to stream the digital signal into a memory 731. In particular, in some embodiments, the processing device 729 separates the multiplexed digital signal into the separate signals corresponding to the sampled signals from each of the RF modules. The separate signals are then stored separately in the memory 731. In other embodiments, the multiplexed digital signal is stored directly in the memory 731 without separating the signal. The memory 731 can be of any appropriate memory size for storing the digital signals streamed from the processing device 729. For example, in this embodiment, the memory 731 is 16 MB. However, other sizes of memory can be used in other embodiments. It is to be understood that stored digital signal streams can be deleted after being analyzed to free up space in the memory 731.

A processing unit 733 retrieves signals from the memory 731 to perform signal analysis on the individual signals corresponding to the input sampled signals from the RF modules. For example, the processing unit 733 includes a microprocessor 735 and a digital signal processor 737 configured to perform the signal analysis discussed above. The processing unit 733 is configured to provide the results of the analysis to a remote user, such as via a web and SNMP interface, and/or to a display on the control module.

Figure 8:
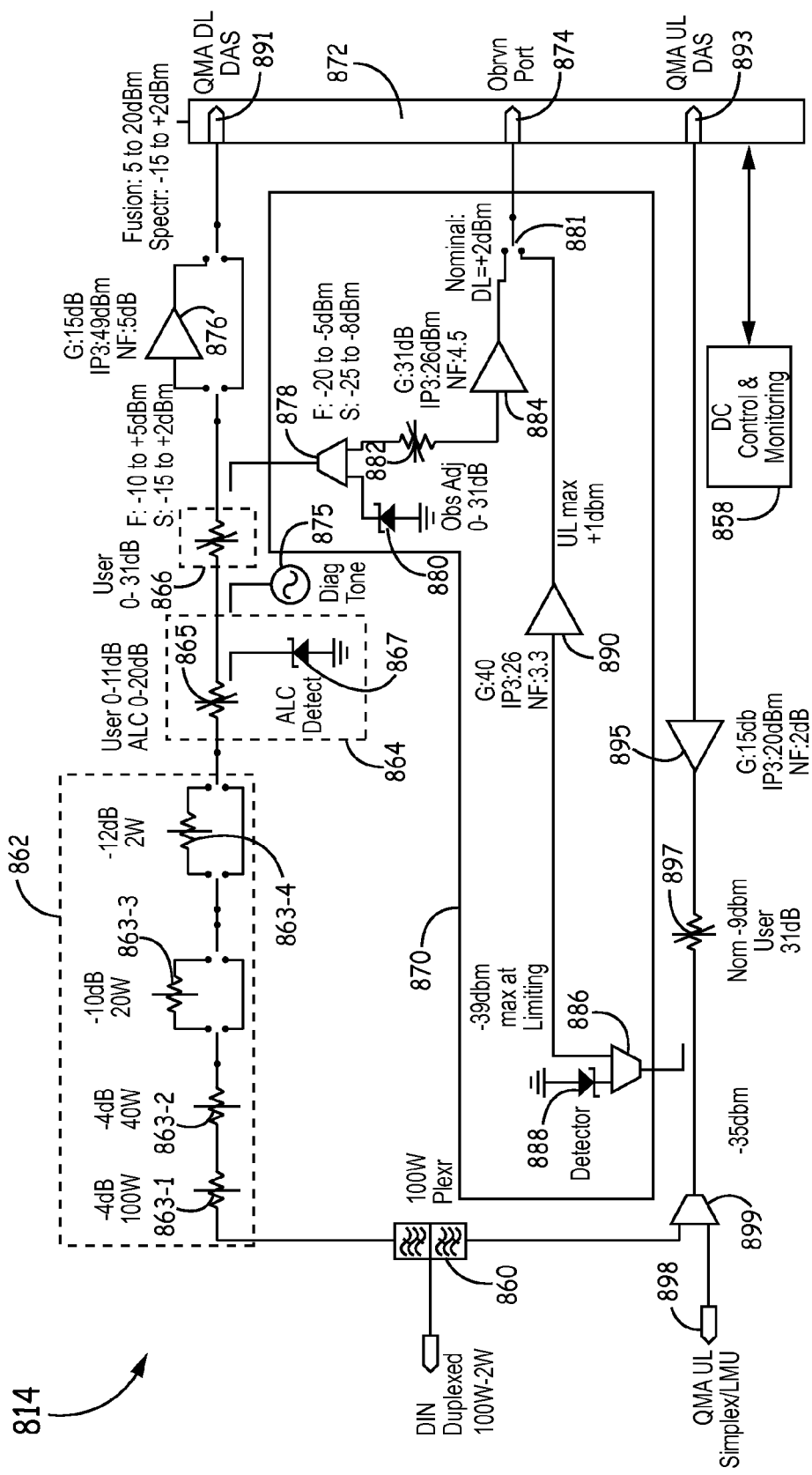
FIG. 8 is a circuit diagram of one embodiment of an RF module.

FIG. 8 is an exemplary circuit diagram of one embodiment of an RF module 814. It is to be understood that values indicated in FIG. 8 for the various components are provided by way of example and not by way of limitation. RF module 814 includes a fixed attenuator 862. The fixed attenuator 862 includes a plurality of attenuators 863-1 . . . 863-4 in this example. Attenuators 863-1 . . . 863-4 each have a specific attenuation level. Exemplary attenuation levels for each of attenuators 863-1 . . . 863-4 are shown in FIG. 8. However, it is to be understood that the specific attenuation levels are dependent on the specific implementation and can vary from one RF module to another. Attenuators 863-2 and 863-4 are each selectively switched in or out of the circuit. Thus, one or both can be excluded based on user input depending on the desired power level. The ALC 864 includes a variable attenuator 865 and an ALC detect circuit 867 to vary the attenuation level of the variable attenuator 865.

The RF module 814 also includes a tone generator 875 configured to generate a downlink path diagnostic tone that is injected into the downlink path to help with commissioning and troubleshooting of DAS systems in the field. For example, RF detectors can be placed at the downlink output of each path in a splitter/combiner tray. The RF detector used in conjunction with the diagnostic tone can measure and determine the splitter/combiner loss. Knowing the splitter/combiner loss eases installation by reducing user input. The diagnostic tone can be configured to default at the center of the supported frequency band. However, the tone can be tuned within the band's frequency range. The power level of the diagnostic tone, in this example, is in the range from −31 dBm to 0 dBm within 0.5 dB accuracy as measured at the output of the RF module. The specified signal level is independent of the AIP user gain configuration.

The RF module 814 also includes a variable attenuator 866 and a gain amplifier 876. The gain amplifier 876 can be selectively switched in or out of the circuit path, based on user configuration. The RF module 814 also includes a monitor 870 configured to sample the uplink and downlink path. For the downlink path, the monitor 870 includes a splitter 878, detector 880, variable attenuator 882, and gain amplifier 884 to condition the sampled signal. For the uplink path, the monitor 870 includes a splitter 886, a detector 888, and a gain amplifier 890 to condition the sampled signal. As discussed above, the monitor 870 provides a sample of the uplink and downlink signals to a control module via an observation port 874 coupled to the backplane 872. In particular, the monitor 870 includes an RF switch 881 to select the uplink or downlink and the selected signal is fed to the controller module 816 via the observation port 874 (RF connector) on the backplane 872.

In this example, a simplex downlink port 891 to the DAS and a simplex uplink port 893 from the DAS are included in the backplane 872. In particular, in this embodiment ports 891 and 893 are implemented with QMA RF connectors. It is to be understood that the ports 891 and 893 can be located in different locations in other embodiments and are not required to be coupled to the backplane 872. On the uplink path from the uplink port 893, the RF module 814 includes a gain amplifier 895 and a variable attenuator 897, the attenuation level of which is controlled by a user. The RF module 814 also includes a splitter 899 which provides a copy of the uplink signal to the duplexer 860 for transmission to the upstream network device. A copy of the uplink signal is also provided to a simplex output port 898. The output port 898 can be a simplex BTS port or LMU port for a GSM module.

In addition, RF module 814 includes a DC control and monitoring unit 858 coupled to the backplane 872. The RF module 814 receives electrical power via the backplane 872. In particular, the backplane 872 provides DC power to all modules as well as an RF and control interface between the RF Modules, Control module and Splitter/Combiner tray. The DC control and monitoring unit 858 controls the power level of the received DC power for use by the RF module 814.

Figure 10:
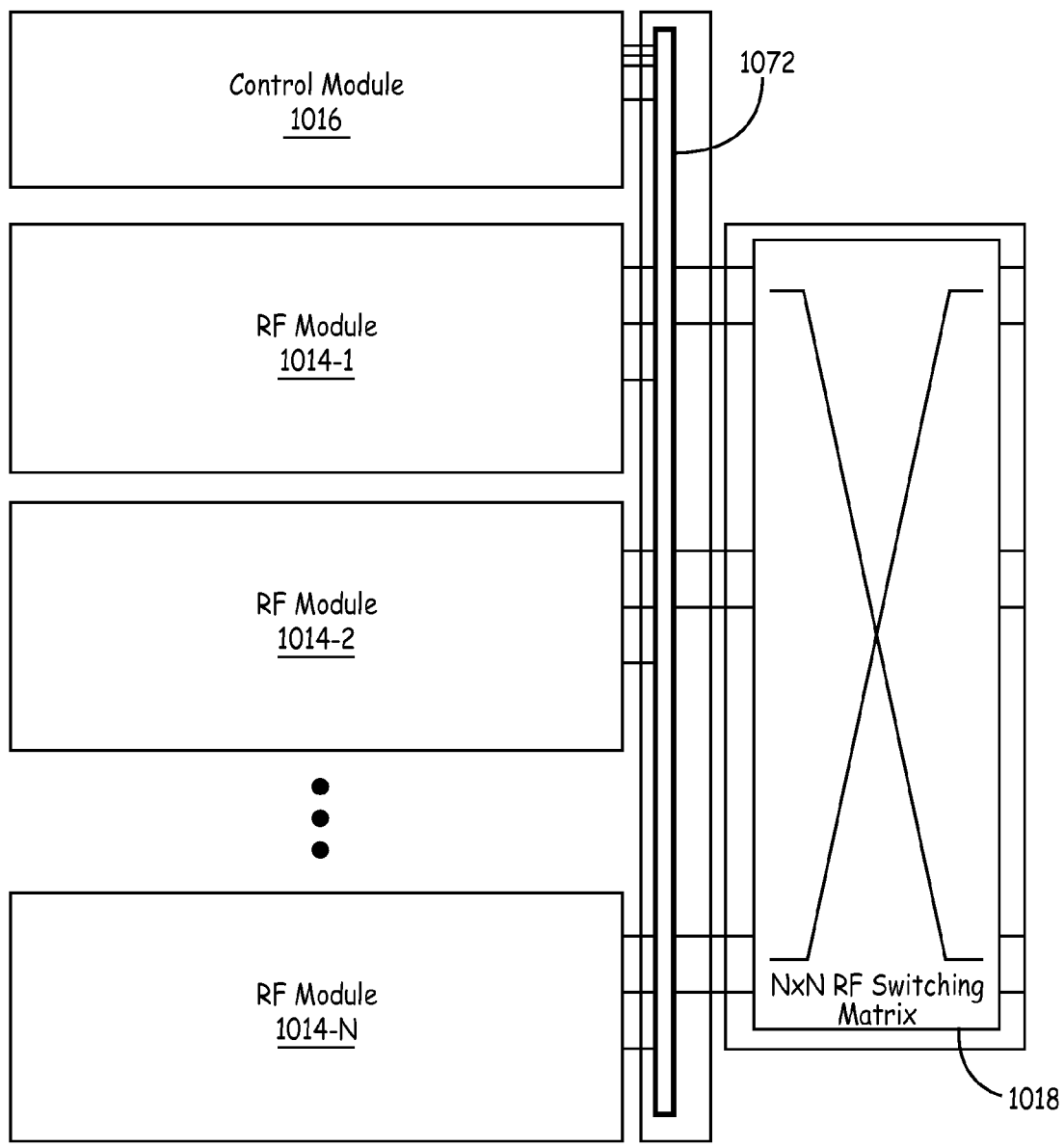
FIG. 10 is a high level block diagram of one embodiment of an active integration panel having a switch matrix.

In one embodiment, the backplane 872 accepts an N×N switch matrix, such as switch matrix 1018 shown in FIG. 10, where N is the total number of RF modules. The N×N matrix is used in such embodiments in place of a passive splitter/combiner tray, such as the splitter/combiner tray depicted in FIG. 9, to provide a software configurable split and combine function. The N×N switch matrix 1018 consists of a plurality of software controlled RF switches and amplifiers, as discussed in more detail below. The RF switch and amplifier control is accomplished with a decoding scheme or a dedicated microcontroller. A control and or I/O interface is included from the control module slot to the splitter/combiner slot with a sufficient number of pins allocated to provide flexibility. An exemplary N×N switch matrix is discussed in more detail with respect to FIGS. 11A and 11B.

FIG. 9 is a block diagram of one embodiment of an exemplary passive splitter/combiner tray 918. The splitter/combiner tray 918 includes a plurality of connectors 961 that are coupled to a backplane. The connectors 961 receive signals from and transmit signals to the RF modules. For example, the port 891 in FIG. 8 of each RF module provides a signal to a corresponding connector 961. Similarly, the port 893 in each RF module receives a signal from a corresponding connector 961. The splitter/combiner tray 918 combines and splits signals as discussed above.

In particular, in this example, signals from each of connectors 961-1 . . . 961-4 are combined in a 4 way splitter/combiner 965 to form a composite signal. A copy of the composite signal is then provided from a two way splitter/combiner 967 to each of connectors 963-1 and 963-2 for coupling to a corresponding DAS host unit. In the reverse direction, signals from the corresponding DAS host unit are provided to connectors 963-1 and 963-2. The received signals are combined in the two way splitter/combiner 967 and then split into signals corresponding to the respective RF modules in the 4 way splitter/combiner 965. The respective signals are then provided to the corresponding RF module via the connectors 961-1 . . . 961-4.

Similarly, signals from connectors 961-5 and 961-6 are combined in a two way splitter/combiner 969 to form a second composite signal. A copy of the second composite signal is then provided from another two way splitter/combiner 971 to each of the connectors 963-2 and 963-4 for connections to corresponding DAS host units. In the reverse direction, the signals received from the corresponding DAS host units are combined in the two way splitter/combiner 971. The combined signal is then split in the splitter/combiner 969 for delivery to the corresponding connector 961-5 and 961-6.

Signals from connector 961-7 are split in splitter/combiner 973 to deliver a copy of the signals to each of connectors 963-5 and 963-6. In the reverse direction signals from connectors 963-5 and 963-6 are combined in the splitter/combiner 973 for delivery to connector 961-7. Similarly, signals from connector 961-8 are split in splitter/combiner 975 to deliver a copy of the signals to each of connectors 963-7 and 963-8. In the reverse direction signals from connectors 963-7 and 963-8 are combined in the splitter/combiner 975 for delivery to connector 961-8.

The splitter/combiner tray 918 also includes a plurality of detectors 977. The RF detectors 977 are placed at the downlink output of each path. As discussed above, the detectors 977 used in conjunction with a diagnostic tone can measure and determine the splitter/combiner loss.

It is to be understood that splitter/combiner tray 918 is provided by way of example. In particular, it is to be understood that other configurations of splitter/combiners as well as which signals are combined/split are dependent on the configuration of the specific implementation.

Figure 11A:
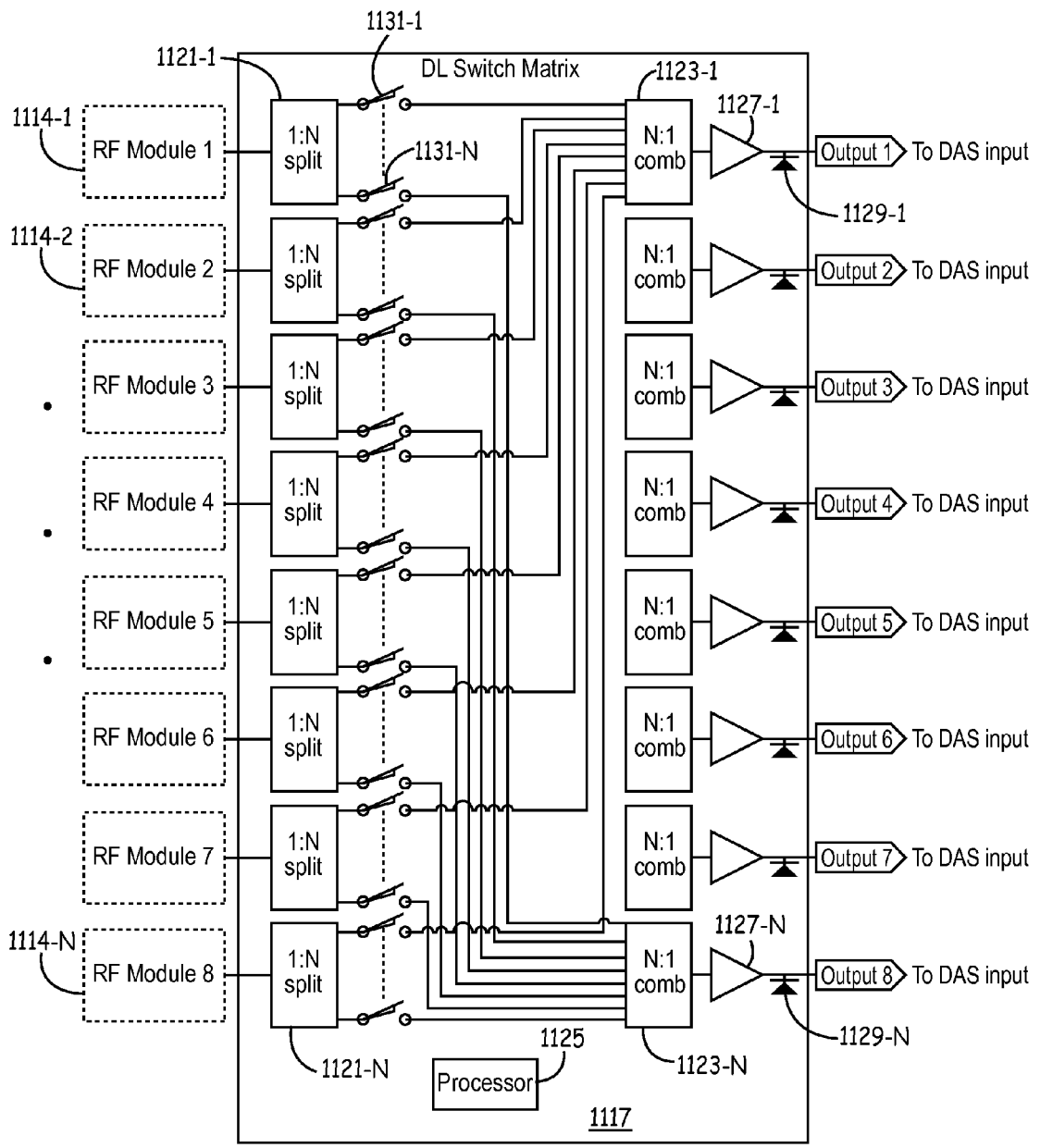
FIG. 11A is a block diagram of one embodiment of an N×N downlink switch matrix.

FIG. 11A is a block diagram of one embodiment of an N×N downlink switch matrix 1117 which can be used in place of the passive splitting/combining in splitter/combiner tray 918 in alternative embodiments. As shown in FIG. 11, the N×N switch matrix 1117 is coupled to the RF modules 1114-1 ... 1114-N via a backplane 1172, as discussed above and shown in FIG. 10. In this example, there are 8 RF modules 1114. Hence, the N×N switch matrix 1117 is an 8×8 switch matrix in this example.

The switch matrix 1117 includes a plurality of one-to-many (1:N) splitters 1121-1 ... 1121-N, one splitter 1121 for each corresponding RF module 1114. Each of the 1:N splitters 1121 splits each RF signal received from the corresponding RF module 1114 into N copies of the RF signal. Each copy of the RF signal is provided to a corresponding switch 1131. In particular, N switches 1131 are coupled to each splitter 1121, one switch 1131 for each copy of the RF signal from the corresponding splitter 1121. Each switch 1131 is also coupled to a corresponding many-to-one (N:1) combiner 1133. When a respective switch 1131 is closed, the RF signal is provided to the corresponding N:1 combiner 1133 coupled to the respective switch 1131. If each of the N switches 1131 coupled to a respective 1:N splitter 1121 are closed, then a copy of the RF signal received from the corresponding RF module 1114 is provided to each of the plurality of N:1 combiners 1133. If a switch 1131 is open, then the corresponding copy of the RF signal does not propagate beyond the switch 1131. In addition, the switches 1131 are implemented as absorptive RF switches to prevent reflections when a given switch 1131 is open.

Each N:1 combiner 1133 is configured to combine the received signals into a single signal which is output to a corresponding DAS interface port. In this embodiment, a corresponding amplifier 1127 is included in the RF path between each N:1 combiner 1133 and the respective DAS interface port. The amplifier 1127 helps compensate for losses in the RF signal due to the splitters 1121, combiners 1133, switches 1131 and traces. In addition, in some embodiments, an RF detector 1129 is coupled to the RF path between each N:1 combiner 1133 and the respective DAS interface port to monitor the RF signals at the output ports.

The processor 1125 is configured to control the state of each switch 1131 coupled to each corresponding splitter 1121. In particular, the processor 1125 outputs commands to open or close each switch 1131. Hence, the processor 1125 enables the ability to control which RF modules 1114 are coupled to each DAS interface port. In particular, the switch matrix 1117 enables the signals from multiple RF modules 1114 to be combined to any DAS interface ports.

Figure 11B:
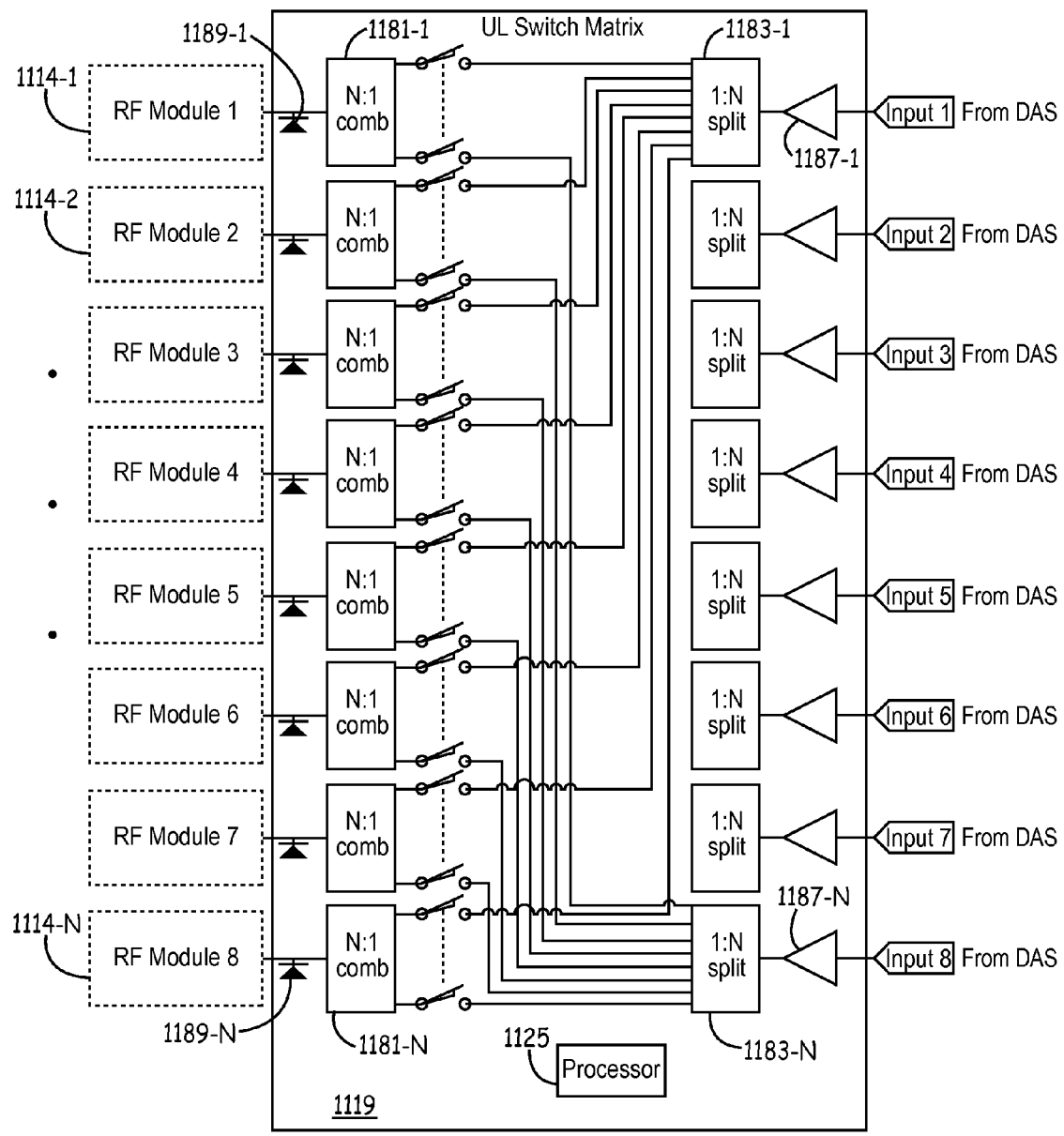
FIG. 11B is a block diagram of one embodiment of an N×N uplink switch matrix.

The uplink switching matrix 1119, shown in FIG. 11B, for signals from a DAS interface port to the corresponding RF modules 1114 is configured similarly to the downlink switching matrix 1117 shown in FIG. 11A. In particular, the uplink switching matrix 1119 includes a plurality of N:1 combiners 1181 and a plurality of 1:N splitters 1183. Each of the 1:N splitters 1183 are coupled to a corresponding DAS interface port. Each 1:N splitter 1183 receives an uplink RF signal from the corresponding DAS interface port and splits it into N copies of the RF signal. Each copy of the RF signal is provided to a corresponding switch 1185 which is coupled to a respective N:1 combiner 1181. Each N:1 combiner 1181 combines the received signals into a single RF signal and outputs the combined signal to a respective RF module 1114 coupled to the N:1 combiner 1181. In this embodiment, the uplink switching matrix 1119 also includes a respective amplifier 1187 in the RF path between the input from the DAS and the respective 1:N splitter 1183. The uplink switching matrix 1119 also includes an RF detector 1189 in the RF path of the RF signal output from each N:1 combiner 1181. The processor 1125 also controls the state of the switches 1185. The switch and combiner/splitter functions discussed above are performed at RF in analog format in this example.

It is to be understood that the uplink switching matrix 1119 and the downlink switching matrix 1117 are implemented in a single device even though they are shown separately in the Figures for purposes of explanation. Similarly, although the backplane is not shown in FIGS. 11A and 11B, it is to be understood that the uplink switching matrix 1119 and the downlink switching matrix 1117 can be coupled to the RF modules 1114 via a backplane as discussed above. The backplane provides an interface to the uplink and downlink switching matrices 1119/1117 for RF from the RF module sample ports, dc power input and micro processor communication link. In addition, the uplink switching matrix 1119 and the downlink switching matrix 1117 can include other components not shown, such as Direct Current (DC) to DC power converters used in operation of the switching matrices.

Figure 12:
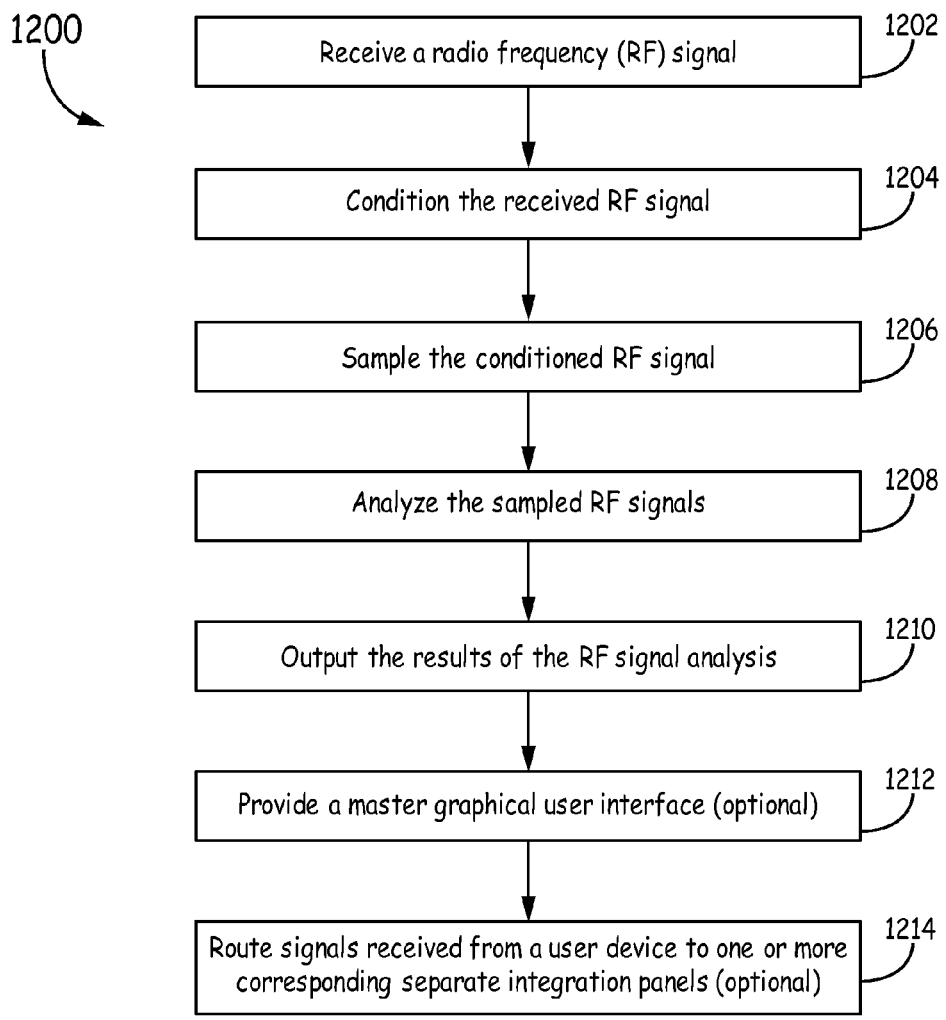
FIG. 12 is a flow chart of one embodiment of an exemplary method of operation of an integration panel.

FIG. 12 is a flow chart of one embodiment of a method 1200 of operation of an integration panel. The method 1200 can be implemented in an integration panel such as integration panel 604 discussed above. At block 1202, a radio frequency (RF) signal from at least one network device is received at each of a plurality of RF modules. At block 1204, the received RF signals are conditioned at each of the respective RF modules. In particular the RF signals are conditioned for transmission to a host unit of a distributed antenna system. For example in some embodiments, conditioning the RF signals includes automatically adjusting signal power of the received RF signal at each of the respective RF modules based on factors such as, the signal's communication protocol, the service provider of the communication network over which the signal is communicated, or the frequency band of the signal.

At block 1206, the conditioned RF signal is sampled at each of the respective RF modules. At block 1208, the sampled RF signals from each of the RF modules are sampled. In particular, the sampled RF signals from each RF module are provided to a control module for analysis. The control module performs the signal analysis on the sampled RF signals. At block 1210, the results of the analysis are output. For example, the results can be output to a user device located remotely from the integration panel and/or to a display on the control module. In some embodiments, a subset of the results that are provided to a remotely located user device are also provided to a display on the control module.

At block 1212, the control module optionally provides a master graphical user interface to the user device. The master graphical user interface is configured to provide remote access to the host unit of the DAS and to the control module. At block 1214, the control module is optionally configured to route signals received from the user device to one or more corresponding separate integration panels such that a plurality of integration panels are coupled to the user device via a single integration panel. The signals from the user device are received via an external network which is not used for communicating the RF signals between the network devices and the wireless devices in communication with the distributed antenna system.

Example Embodiments

Example 1 includes an integration panel comprising: a control module; a plurality of radio frequency (RF) modules; and a backplane configured to couple the plurality of RF modules to the control module; wherein each of the plurality of RF modules is configured to be coupled to a respective network device and to a host unit of a distributed antenna system, each RF module further configured to condition the received RF signals received from the respective network device and to provide the conditioned RF signals to the host unit; wherein each of the RF modules is configured to sample the conditioned RF signals and to provide the sampled RF signals to the control module via the backplane; wherein the control module is configured to perform signal analysis of the sampled RF signals received from each of the plurality of RF modules and to provide the results of the signal analysis to a user device located remotely from the integration panel.

Example 2 includes the integration panel of Example 1, wherein the control module comprises: a plurality of networking ports, a first networking port of the networking ports configured to be coupled to the user device via an external network which is not used for communicating signals between network devices and wireless devices in communication with the distributed antenna system; wherein at least one other networking port of the plurality of networking ports is coupled to a network port in a respective separate integration panel; wherein the control module further comprises a processor configured to route signals received from the user device over the first networking port to the corresponding separate integration panel such that a plurality of integration panels communicate with the user device via the first networking port.

Example 3 includes the integration panel of any of Examples 1-2, wherein the control module is configured to provide a master graphical user interface to the user device, the master graphical user interface configured to provide remote access to both the host unit and the control module.

Example 4 includes the integration panel of any of Examples 1-3, wherein each of the RF modules is configured to monitor and control the power of signals received from the respective network device automatically based on one or more of the received RF signals' protocol, service provider, or frequency band.

Example 5 includes the integration panel of any of Examples 1-4, further comprising: a splitter/combiner tray coupled to each of the plurality of RF modules; wherein the splitter/combiner tray is configured to combine RF signals from two or more of the plurality of RF modules for input to the host unit and to separate signals received from the host unit for delivery of the separated signals to the respective RF module.

Example 6 includes the integration panel of Example 5, wherein the splitter/combiner tray comprises an uplink switching matrix and a downlink switching matrix, each of the uplink switching matrix and the downlink switching matrix comprising a plurality of absorptive RF switches coupled to each RF module.

Example 7 includes the integration panel of any of Examples 5-6, wherein each RF module includes a tone generator configured to inject a diagnostic tone into a downlink signal path of the RF signals received from the respective network device; wherein the splitter/combiner tray includes at least one respective RF detector configured to detect a corresponding diagnostic tone in order to determine signal loss due to the splitter/combiner tray.

Example 8 includes the integration panel of any of Examples 1-7, wherein each of the RF modules is configured to support a respective RF frequency band, each respective RF frequency band within a frequency range of 690 MHz to 2700 MHz.

Example 9 includes a network comprising: a distributed antenna system comprising a host unit and a plurality of remote antenna units coupled to the host unit, the remote antenna units configured to transmit and receive wireless signals; and an integration panel, the integration panel comprising: a control module; a plurality of radio frequency (RF) modules; and a backplane configured to couple the plurality of RF modules to the control module; wherein each of the plurality of RF modules is coupled to a respective one of a plurality of network devices configured to transmit and receive signals according to a respective communication technology, each RF module further configured to condition signals received from the respective network device and to provide the conditioned RF signals to the host unit of the distributed antenna system; wherein each of the RF modules is configured to sample the conditioned RF signals and to provide the sampled RF signals to the control module via the backplane; wherein the control module is configured to perform signal analysis of the sampled RF signals and to provide the results of the signal analysis to a user device located remotely from the active integration panel.

Example 10 includes the network of Example 9, wherein the control module comprises: a plurality of networking ports, a first networking port of the networking ports configured to be coupled to the user device via an external network which is not used for communicating signals between the network devices and wireless devices in communication with the distributed antenna system; wherein at least one other networking port of the plurality of networking ports is coupled to a network port in at least one second integration panel; wherein the control module further comprises a processor configured to route signals received from the user device over the first networking port to the corresponding second integration panel such that a plurality of integration panels communicate with the user device via the first networking port.

Example 11 includes the network of any of Examples 9-10, wherein the control module is configured to provide a master graphical user interface to the user device, the master graphical user interface configured to provide remote access to both the host unit and the control module.

Example 12 includes the network of any of Examples 9-10, wherein the host unit is configured to provide a master graphical user interface to the user device, the master graphical user interface configured to provide remote access to both the host unit and the control module.

Example 13 includes the network of any of Examples 9-12, wherein each of the RF modules is configured to monitor and control the power of signals received from the respective network device automatically based on one or more of the received RF signals' protocol, service provider, or frequency band.

Example 14 includes the network of any of Examples 9-13, wherein the integration panel further comprises: a splitter/combiner tray coupled to each of the plurality of RF modules; wherein the splitter/combiner tray is configured to combine RF signals from two or more of the plurality of RF modules for input to the host unit and to separate signals received from the host unit for delivery of the separated signals to the corresponding RF module.

Example 15 includes the network of Example 14, wherein the splitter/combiner tray comprises an uplink switching matrix and a downlink switching matrix, each of the uplink switching matrix and the downlink switching matrix comprising a plurality of absorptive RF switches coupled to each RF module.

Example 16 includes the network of any of Examples 14-15, wherein each RF module includes a tone generator configured to inject a diagnostic tone into a downlink signal path of the RF signals received from the respective network device; wherein the splitter/combiner tray includes at least one respective RF detector configured to detect a corresponding diagnostic tone injected by the respective RF module, the detected diagnostic tone used to determine signal loss due to the splitter/combiner tray.

Example 17 includes a method of operation of an integration panel, the method comprising: receiving a radio frequency (RF) signal from at least one network device at each of a plurality of RF modules; conditioning the received RF signal at each of the respective RF modules for transmission to a host unit of a distributed antenna system; sampling the conditioned RF signal at each of the respective RF modules; analyzing the sampled RF signals from each of the RF modules at a control module; and outputting the results of the RF signal analysis from the control module to a user device located remotely from the integration panel.

Example 18 includes the method of Example 17, wherein conditioning the received RF signal comprises automatically adjusting signal power of the received RF signal at each of the respective RF modules based on one or more of the received RF signals' protocol, service provider, or frequency band.

Example 19 includes the method of any of Examples 17-18, further comprising providing a master graphical user interface from the control module to the user device, the master graphical user interface configured to provide remote access to both the host unit and the control module.

Example 20 includes the method of any of Examples 17-19, further comprising: receiving signals from the user device via an external network which is not used for communicating RF signals between the network devices and wireless devices in communication with the distributed antenna system; and routing the received signals to one or more corresponding separate integration panels such that a plurality of integration panels are coupled to the user device via a single integration panel.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An integration panel comprising:
a control module;
a plurality of radio frequency (RF) modules; and
a backplane configured to couple the plurality of RF modules to the control module;
wherein each of the plurality of RF modules is configured to be coupled to a respective network device and to a host unit of a distributed antenna system, each RF module further configured to condition the received RF signals received from the respective network device and to provide the conditioned RF signals to the host unit;
wherein each of the RF modules is configured to sample the conditioned RF signals and to provide the sampled RF signals to the control module via the backplane;
wherein the control module is configured to perform signal analysis of the sampled RF signals received from each of the plurality of RF modules and to provide the results of the signal analysis to a user device located remotely from the integration panel.

2. The integration panel of claim 1, wherein the control module comprises:
a plurality of networking ports, a first networking port of the networking ports configured to be coupled to the user device via an external network which is not used for communicating signals between network devices and wireless devices in communication with the distributed antenna system;
wherein at least one other networking port of the plurality of networking ports is coupled to a network port in a respective separate integration panel;
wherein the control module further comprises a processor configured to route signals received from the user device over the first networking port to the corresponding separate integration panel such that a plurality of integration panels communicate with the user device via the first networking port.

3. The integration panel of claim 1, wherein the control module is configured to provide a master graphical user interface to the user device, the master graphical user interface configured to provide remote access to both the host unit and the control module.

4. The integration panel of claim 1, wherein each of the RF modules is configured to monitor and control the power of signals received from the respective network device automatically based on one or more of the received RF signals' protocol, service provider, or frequency band.

5. The integration panel of claim 1, further comprising:
a splitter/combiner tray coupled to each of the plurality of RF modules;
wherein the splitter/combiner tray is configured to combine RF signals from two or more of the plurality of RF modules for input to the host unit and to separate signals received from the host unit for delivery of the separated signals to the respective RF module.

6. The integration panel of claim 5, wherein the splitter/combiner tray comprises an uplink switching matrix and a downlink switching matrix, each of the uplink switching matrix and the downlink switching matrix comprising a plurality of absorptive RF switches coupled to each RF module.

7. The integration panel of claim 5, wherein each RF module includes a tone generator configured to inject a diagnostic tone into a downlink signal path of the RF signals received from the respective network device;
wherein the splitter/combiner tray includes at least one respective RF detector configured to detect a corresponding diagnostic tone in order to determine signal loss due to the splitter/combiner tray.

8. The integration panel of claim 1, wherein each of the RF modules is configured to support a respective RF frequency band, each respective RF frequency band within a frequency range of 690 MHz to 2700 MHz.

9. A network comprising:
a distributed antenna system comprising a host unit and a plurality of remote antenna units coupled to the host unit, the remote antenna units configured to transmit and receive wireless signals; and
an integration panel, the integration panel comprising:
a control module;
a plurality of radio frequency (RF) modules; and
a backplane configured to couple the plurality of RF modules to the control module;
wherein each of the plurality of RF modules is coupled to a respective one of a plurality of network devices configured to transmit and receive signals according to a respective communication technology, each RF module further configured to condition signals received from the respective network device and to provide the conditioned RF signals to the host unit of the distributed antenna system;

wherein each of the RF modules is configured to sample the conditioned RF signals and to provide the sampled RF signals to the control module via the backplane;

wherein the control module is configured to perform signal analysis of the sampled RF signals and to provide the results of the signal analysis to a user device located remotely from the active integration panel.

10. The network of claim 9, wherein the control module comprises:

a plurality of networking ports, a first networking port of the networking ports configured to be coupled to the user device via an external network which is not used for communicating signals between the network devices and wireless devices in communication with the distributed antenna system;

wherein at least one other networking port of the plurality of networking ports is coupled to a network port in at least one second integration panel;

wherein the control module further comprises a processor configured to route signals received from the user device over the first networking port to the corresponding second integration panel such that a plurality of integration panels communicate with the user device via the first networking port.

11. The network of claim 9, wherein the control module is configured to provide a master graphical user interface to the user device, the master graphical user interface configured to provide remote access to both the host unit and the control module.

12. The network of claim 9, wherein the host unit is configured to provide a master graphical user interface to the user device, the master graphical user interface configured to provide remote access to both the host unit and the control module.

13. The network of claim 9, wherein each of the RF modules is configured to monitor and control the power of signals received from the respective network device automatically based on one or more of the received RF signals' protocol, service provider, or frequency band.

14. The network of claim 9, wherein the integration panel further comprises:

a splitter/combiner tray coupled to each of the plurality of RF modules;

wherein the splitter/combiner tray is configured to combine RF signals from two or more of the plurality of RF modules for input to the host unit and to separate signals received from the host unit for delivery of the separated signals to the corresponding RF module.

15. The network of claim 14, wherein the splitter/combiner tray comprises an uplink switching matrix and a downlink switching matrix, each of the uplink switching matrix and the downlink switching matrix comprising a plurality of absorptive RF switches coupled to each RF module.

16. The network of claim 14, wherein each RF module includes a tone generator configured to inject a diagnostic tone into a downlink signal path of the RF signals received from the respective network device;

wherein the splitter/combiner tray includes at least one respective RF detector configured to detect a corresponding diagnostic tone injected by the respective RF module, the detected diagnostic tone used to determine signal loss due to the splitter/combiner tray.

17. A method of operation of an integration panel, the method comprising:

receiving a radio frequency (RF) signal from at least one network device at each of a plurality of RF modules;

conditioning the received RF signal at each of the respective RF modules for transmission to a host unit of a distributed antenna system;

sampling the conditioned RF signal at each of the respective RF modules;

analyzing the sampled RF signals from each of the RF modules at a control module; and outputting the results of the RF signal analysis from the control module to a user device located remotely from the integration panel.

18. The method of claim 17, wherein conditioning the received RF signal comprises automatically adjusting signal power of the received RF signal at each of the respective RF modules based on one or more of the received RF signals' protocol, service provider, or frequency band.

19. The method of claim 17, further comprising providing a master graphical user interface from the control module to the user device, the master graphical user interface configured to provide remote access to both the host unit and the control module.

20. The method of claim 17, further comprising:

receiving signals from the user device via an external network which is not used for communicating RF signals between the network devices and wireless devices in communication with the distributed antenna system; and routing the received signals to one or more corresponding separate integration panels such that a plurality of integration panels are coupled to the user device via a single integration panel.

* * * * *